United States Patent [19]
Kolawa et al.

[11] Patent Number: 5,761,408
[45] Date of Patent: Jun. 2, 1998

[54] METHOD AND SYSTEM FOR GENERATING A COMPUTER PROGRAM TEST SUITE USING DYNAMIC SYMBOLIC EXECUTION

[75] Inventors: Adam K. Kolawa, Sierra Madre; Roman Salvador, La Jolla; Wendell T. Hicken, Whittier, all of Calif.; Bryan R. Strickland, Raleigh, N.C.

[73] Assignee: Parasoft Corporation, Monrovia, Calif.

[21] Appl. No.: 599,719

[22] Filed: Feb. 12, 1996

Related U.S. Application Data

[63] Continuation-in-part of Ser. No. 587,208, Jan. 16, 1996, abandoned.
[51] Int. Cl.$^6$ ................................................ G06F 11/00
[52] U.S. Cl. .............................. 395/183.14; 364/267.91
[58] Field of Search ....................... 395/183.14, 183.01; 364/267, 280, 267.91, 708

[56] References Cited

U.S. PATENT DOCUMENTS

| 5,050,168 | 9/1991 | Paterson ........................... 395/183.11 |
| 5,581,696 | 12/1996 | Kolawa et al. ...................... 395/183.14 |

OTHER PUBLICATIONS

Ince, "The Automatic Generation of Test Data," The Computer Journal, vol. 30, No. 1, 1987, pp. 63–69.

Korel, "Automated Software Test Data Generation," IEEE Transactions on software Engineering, vol. 16, No. 8, Aug. 1990, pp. 870–879.

Korel, "PELAS—Program Error–Locating Assistant System," IEEE Transactions on Software Engineering, vol. 14, No. 9, Sep. 1988, pp. 1253–1260.

Laski et al., "A Data Flow Oriented Program Testing Strategy," IEEE Transactions on Software Engineering, vol. SE-9, No. 3, May 1983, pp. 347–354.

Offutt, "An Integrated Automatic Test Data Generation System," Journal of Systems Integration, 1, 391–409 (1991), pp. 129–147.

*Primary Examiner*—Vincent P. Canney
*Attorney, Agent, or Firm*—Christie, Parker & Hale, LLP

[57] ABSTRACT

A method and system for generating a test suite for a computer program. The computer program comprises program statements and program variables, including at least one input statement having one or more input variables, that are grouped into code blocks and stored in a program database. The test suite comprises sets of inputs. Each of the sets of inputs corresponds to each of the input statements. The program statements corresponding to a candidate code block are read from the program database. Each of the input variables for each input statement and each of the program variables are represented in symbolic form as a symbolic memory value and transforming each program statement dependent on such an input variable into a symbolic expression. A trial set of inputs for each of the input statements is created by finding a solution to the symbolic expression comprising actual input values corresponding to each symbolic memory value using dynamic symbolic exeuction. An execution run of the computer program is performed using the trial set of inputs and analyzing results obtained from the execution run for coverage of the candidate code block. The trial set of inputs are stored into the test suite if coverage of the candidate code block was obtained.

19 Claims, 20 Drawing Sheets

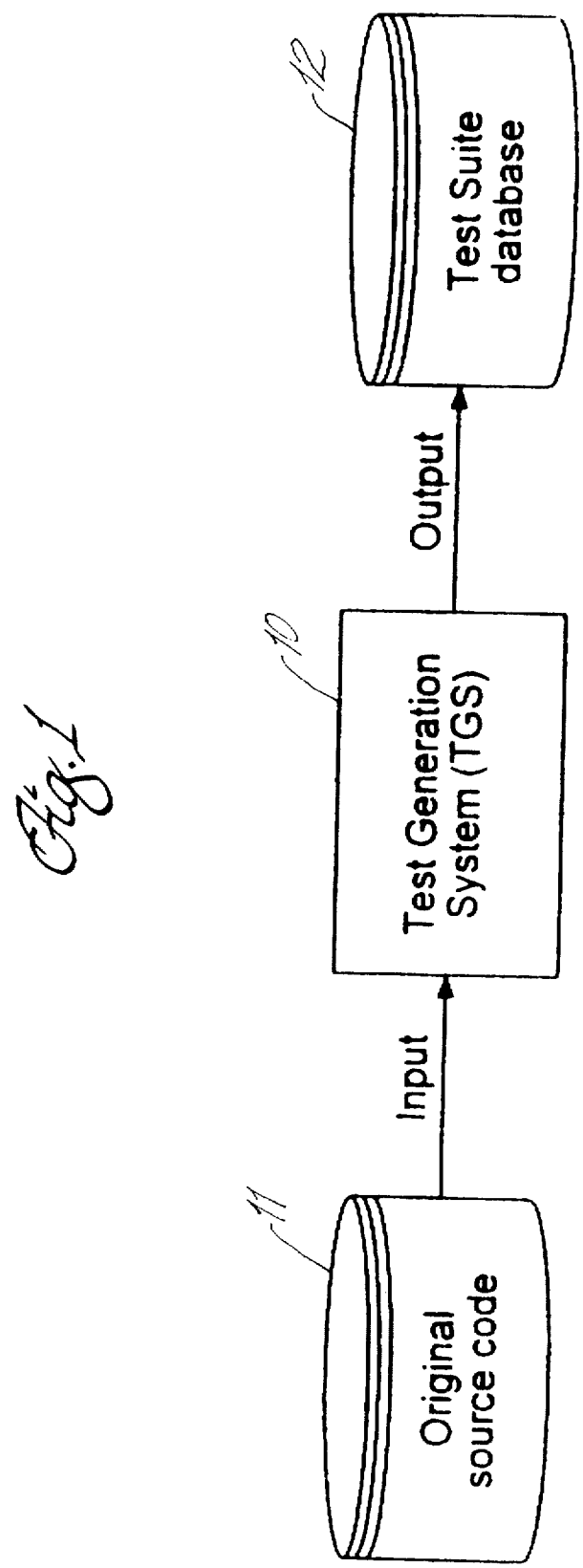

FIG. 2B

```
 1  451-func_decl name=main [tst.c:2] type=450; [P glb norm] body=478;
 2  450 --function type=26; [P]
 3  478 --block prev=451; [tst.c:2-15] scope=453; body=459;
 4  453 ----var_decl name=c [tst.c:3] type=26; [P] next=455;
 5  459 ---comp_stmt [tst.c:5-5] body=458; next=471;
 6  458 ----modify_expr type=26; [P] ops=453; 457;
 7  457 -----call_expr type=26; tgs_node=451; [P] ops=455; <>;
 8  481 ------tgs_node type=26; [] key=2, index=0, elem=0
 9  471 ---if [tst.c:7-12] cond=461; then=463; else=470; next=477;
10  461 ----equality type=26; [P] ops=453; 460;
11  460 -----cons.integer=97; type=22; [P]
12  463 ----comp_stmt prev=471; [tst.c:8-8] body=462;
13  462 -----modify_expr type=26; [P] ops=453; 78;
14   78 ------cons.integer=1; type=26; [P]
15  470 ----if prev=471; [tst.c:9-12] cond=465; then=467; else=469;
16  465 -----equality type=26; [P] ops=453; 464;
17  464 ------cons.integer=98; type=22; [P]
18  467 -----comp_stmt prev=470; [tst.c:10-10] body=466;
19  466 ------modify_expr type=26; [P] ops=453; 79;
20   79 -------cons.integer=2; type;
21  469 -----comp_stmt prev=470; [tst.c:12-12] body=468;
22  468 ------modify_expr type=26; [P] ops=453; 77;
23   77 -------cons.integer=0; type=26; [P]
24  477 ---comp_stmp prev=478; [tst.c:14-14] body=476;
25  476 ----call_expr type=26; [P] ops=473; 475;
26  475 -----list [P] value=77;
```

FIG.2C
```
1   dbase_table_IO:
2   tst.c: 5-[0\2]: c=getchar () ;
```

FIG.2D
```
1    FUNCTION: main, first_block=0, coverage=0%:
2
3    0 -> 1 2 [5:7]
4       <-
5    getchar
6    5: c=getchar ();
7    6:
8    7: if (c=='a')
9    branch_cond_type=BRANCH_IF, key=[0\3]
10
11   1 -> 5 [8:8]
12      <- 0
13   8: c=1;
14
15   2 -> 3 4 [9:9]
16      <- 0
17   9:else if (c=='b')
18   branch_cond_type=BRANCH_IF, key=[0\5]
19
20   3 -> 5 [10:10]
21      <- 2
22   10: c=2;
23
24   4 -> 5 [12:12]
25      <- 2
26   12: c=0;
27
28   5 -> [14:14]
29      <- 3 4 1
30   exit
31   14: exit (0);
```

FIG.4A
```
1    main ()
2    {
3      int c;
4
5      c=getchar ();
6
7      if (c=='a')
8        c=1;
9      else if (c=='b')
10       c=2;
11     else
12       c=0;
13
14     exit (0);
15   }
```

FIG.4B

```
1   main () {
2       int _Insight_spmark;
3       int _Insight_1;
4       int _Insight_2;
5
6       _Insight_ltst815856321();
7       _insight_func_top(1, 33855, (long) &_Insight_spmark, _Insight_strtable);
8       {
9           int c;
10
11          {
12              _Insight_cov_ptr[0]=1;
13              _Insight_tgs_block(0, 5, 0);
14          }
15          c=_insight_tgs_getchar(2);
16          _Insight_1=_Insight_tgs_bc(0, (double) c-(double) 'a', 3);
17          if (_Insight_1) {
18              {
19                  _Insight_cov_ptr[1]=1;
20                  _Insight_tgs_block(1, 8, 0);
21              }
22              c=1;
23          } else {
24              {
25                  _Insight_cov_ptr[2]=1;
26                  _Insight_tgs_block(2, 9, 0);
27              }
28              _Insight_2=_Insight_tgs_bc(2, (couble) c-(double) 'b',
29                  3);
30              if (_Insight_2) {
31                  {
32                      _Insight_cov_ptr[3]=1;
33                      _Insight_tgs_block(3, 10, 0);
34                  }
35                  c=2;
36              } else {
37                  {
38                      _Insight_cov_ptr[4]=1;
39                      _Insight_tgs_block(4, 12, 0);
40                  }
41                  c=0;
42              }
43          }
44          {
45              _Insight_cov_ptr[5]=1;
46              _Insight_tgs_block(5, 14, 0);
47          }
48          _Insight_cov_exit();
49          _Insight_tgs_exit();
50          _Insight_prog_end();
51          _Insight_stack_call(8940);
52          exit(0);
53      }
54  }
```

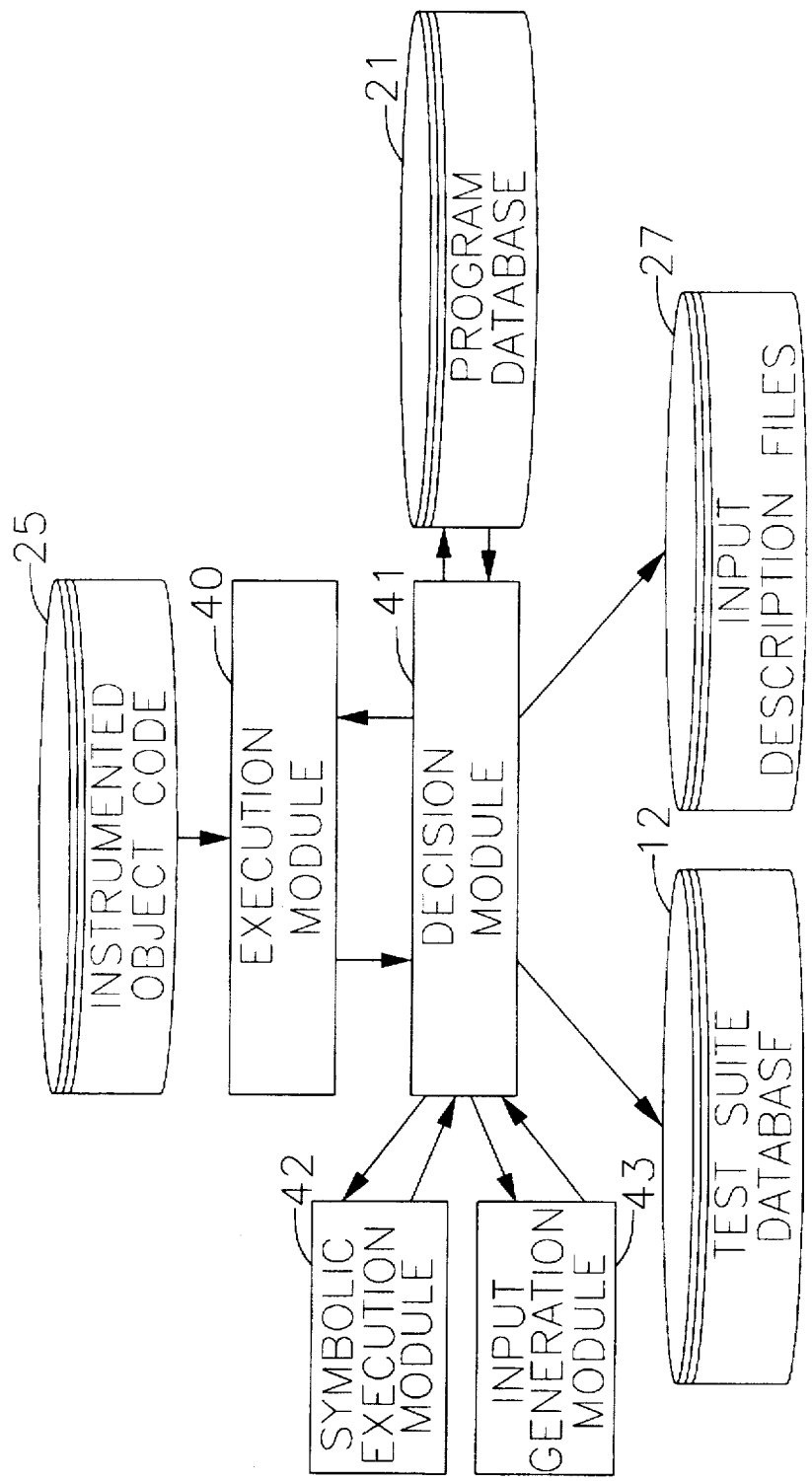

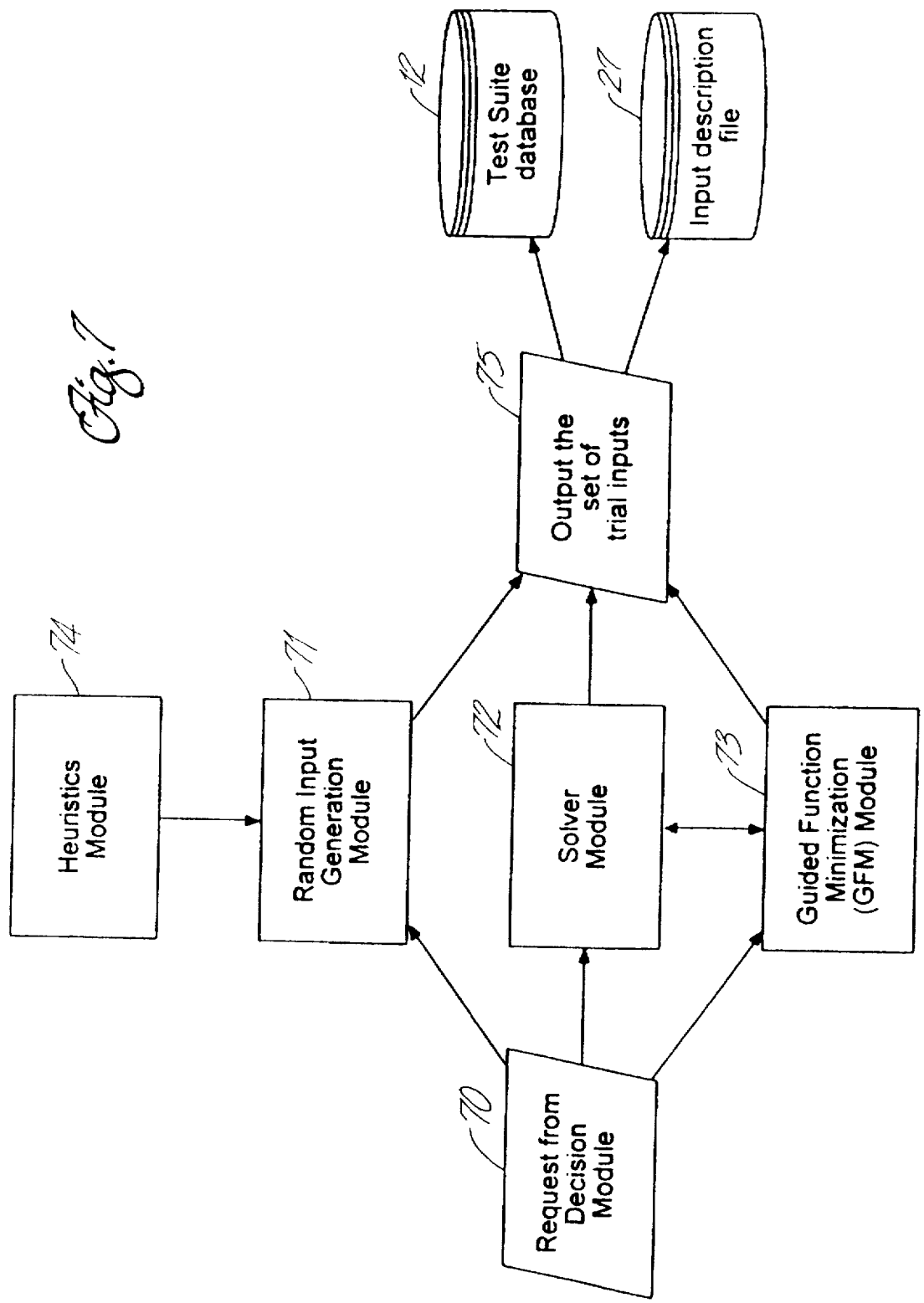

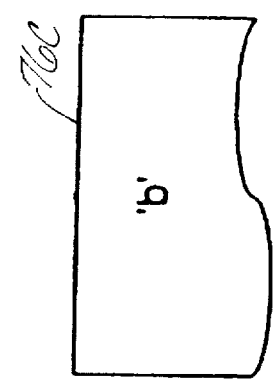
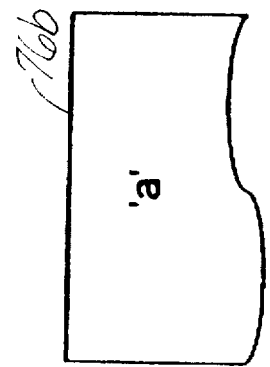
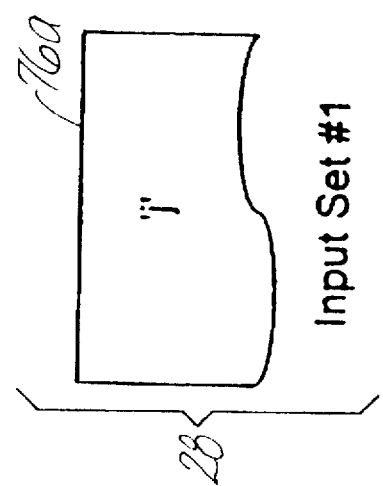
Fig. 8A

Fig. 8B 77c
1-[0v2]: size = 4,
value = 98 'b'
Input Description File #3

77b
1-[0v2]: size = 4,
value = 97 'a'
Input Description File #2

77a
1-[0v2]: size = 4,
value = 106 'j'
Input Description File #1

29

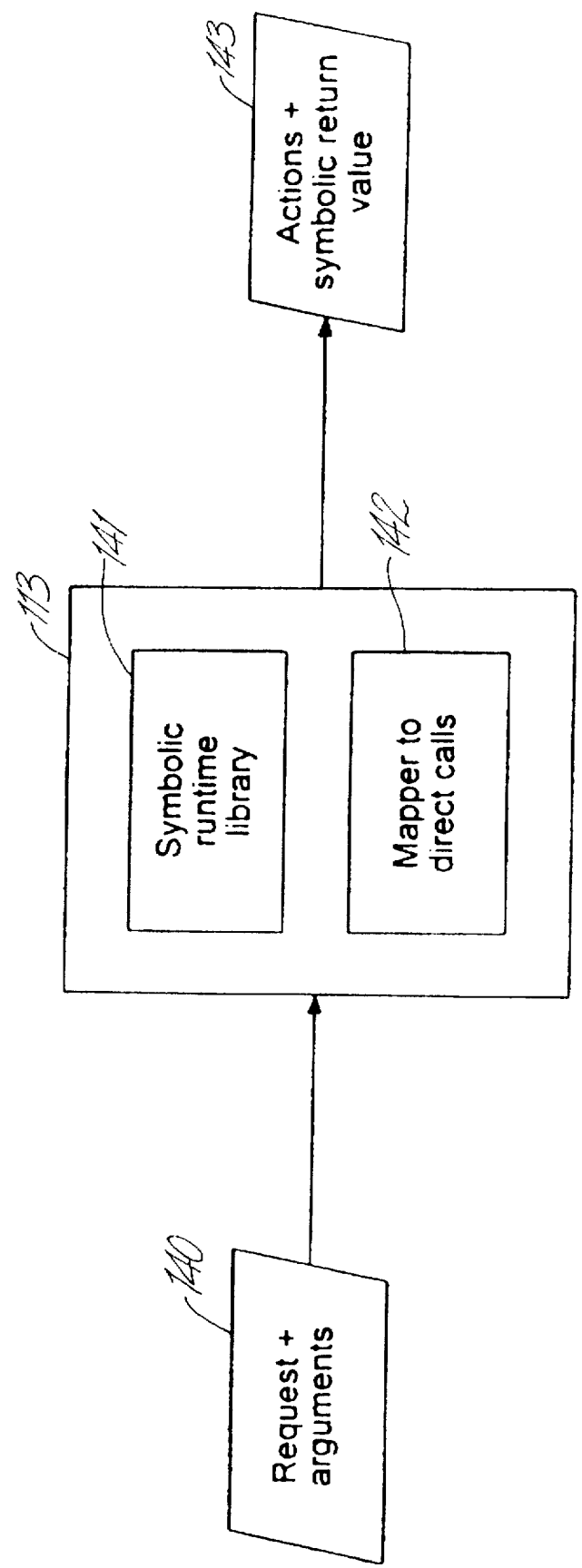

METHOD AND SYSTEM FOR GENERATING A COMPUTER PROGRAM TEST SUITE USING DYNAMIC SYMBOLIC EXECUTION

CROSS REFERENCE TO RELATED APPLICATION

This patent application is a continuation-in-part application of a U.S. patent application Ser. No. 08/587,208 entitled METHOD AND SYSTEM FOR GENERATING A COMPUTER PROGRAM TEST SUITE USING DYNAMIC SYMBOLIC EXECUTION, filed Jan. 16, 1996, now abandoned.

This invention was made with government support under Contract No. DASG60-95-C-0085 from the U.S. Army Space and Strategic Defense Command.

FIELD OF THE INVENTION

The present invention relates to a method and system for generating a computer program test suite and, in particular, to a method and system for generating a computer program test suite using dynamic symbolic execution.

BACKGROUND OF THE INVENTION

Reliable and successful software can only be built through sound, efficient and thorough testing. Unfortunately, software testing is labor intensive and expensive and accounts for approximately 50 percent of commercial software development costs. At the same time, software testing is critical and necessary to achieving quality software.

Software testing involves three tasks: (1) test suite generation; (2) test suite execution validation; and (3) regression testing.

Test suite generation involves creating a set of inputs which force the program under test to execute different parts of the source code. This generated input set is called a "test suite." A good test suite covers most branch conditions and fully exercises the program's functionality.

Test suite execution validation involves executing the program using the test suite and evaluating the program's outputs to validate the program's correctness. Errors detected during this task are corrected and the process is repeated until all tests execute correctly.

Regression testing involves verifying new versions of the program by running the program against the test suite and comparing its outputs to the expected outputs from the original program. This task ensures that changes in the program source code do not introduce new defects.

Historically, test suite generation, test suite execution validation and regression testing were manual tasks. Only efforts to automate regression testing have proven successful. Nevertheless, as the size and complexity of software programs increase, the need to automate test suite generation and test suite execution validation becomes more important. Recent studies indicate that a typical company only tests 30 percent of the source code in the programs it develops. The remaining 70 percent is never tested. One reason is that manual testing only allows the most commonly executed paths to be tested. It is difficult to manually write test suites for testing infrequently executed paths or extreme conditions.

However, the difficulty in generating a test suite that executes most of the source code geometrically increases as the number of lines increases. During testing, source code statements are executed as paths through the source code. A significant number of paths need to be executed to force the program to test most of its source code statements. In a typical 10,000 line program, the number of execution paths grows geometrically to 100 million possible paths, thereby increasing the problem space by four orders of magnitude. As a result, it is infeasible and practically impossible to manually generate and validate a test suite that exercises most of the source code statements except in all but the shortest of computer programs.

Therefore, what is needed is an automated test suite generation tool for assisting a programmer in the generation and the execution validation of test suites capable of covering most source code branches and fully exercising a program's functionality. Desirably, such a tool would automatically generate a test suite for satisfying a required testing criteria, such as statement, branch, segment, data or total path coverage. Moreover, such a tool would be scalable to operate on programs of all sizes and in particular on programs comprising thousands to millions of lines of source code. In addition, such a tool would automatically generate different forms of input sets, including character and graphical input data. Such a tool would drastically reduce the cost of software development by reducing the man-hours spent on test suite generation, significantly improve software quality through complete testing of substantially all parts of a program and encourage programmers to test source code at earlier phases of the program development cycle.

SUMMARY OF THE INVENTION

Accordingly, the present invention enables the above problems to be overcome by providing a method and system for generating a computer program test suite using dynamic symbolic execution. The invention is capable of finding an input for causing a program element, such as a program statement, to be executed in such a manner that is extendable to finding a minimal set of inputs for executing substantially every statement at least once and for taking substantially every branch at least once and optionally for generating as many paths as desired in the total path coverage set.

An embodiment of the present invention is a method and system for generating a test suite for a computer program. The computer program comprises program statements and program variables, including at least one input statement having one or more input variables, that are grouped into code blocks and stored in a program database. The test suite comprises sets of inputs. Each of the sets of inputs corresponds to each of the input statements. The program statements corresponding to a candidate code block are read from the program database. Each of the input variables for each input statement and each of the program variables are represented in symbolic form as a symbolic memory value and transforming each program statement dependent on such an input variable into a symbolic expression. A trial set of inputs for each of the input statements is created by finding a solution to the symbolic expression comprising actual input values corresponding to each symbolic memory value using dynamic symbolic exeuction. An execution run of the computer program is performed using the trial set of inputs and analyzing results obtained from the execution run for coverage of the candidate code block. The trial set of inputs are stored into the test suite if coverage of the candidate code block was obtained.

A further embodiment of the present invention is a method using a computer for creating a symbolic expression using dynamic symbolic execution for use in generating a test suite for a computer program. The computer program comprises program instructions and program variables, including input variables. The program instructions are represented as nodes organized into a hierarchical parse tree. The program variables and input variables are represented in symbolic form as symbolic memory values in nodes organized into a symbolic memory. A node for representing a program instruction is read from the parse tree. Symbolic memory values for each such program variable and each such input variable used by the program instruction are obtained from the symbolic memory. The program instruction are symbolically interpreted using the symbolic memory values instead of actual values for each such program variable and each such input variable used by the program instruction to create the symbolic expression.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

BRIEF DESCRIPTION OF THE DRAWINGS

FIG. 1 is a functional block diagram of a system for generating a computer program test suite constructed in accordance with the present invention;

FIG. 2B is a data structure for a parse tree stored in the program database of FIG. 2A;

FIG. 2C is a data structure for input statements stored in the program database of FIG. 2A;

FIG. 2D is a data structure for block and branch analysis information stored in the program database of FIG. 2A;

FIG. 4A is, by way of example, a source code listing of an original computer program;

FIG. 4B is, by way of example, a source code listing of an instrumented computer program;

FIG. 5 is a functional block diagram of the test generation system driver program of FIG. 2A;

FIG. 7 is a functional block diagram of the input generation module of FIG. 5;

FIG. 8A is, by way of example, a collection of files containing sets of inputs;

FIG. 8B is, by way of example, a collection of input description files;

FIG. 15 is a functional block diagram of the external call resolver of FIG. 12.

DETAILED DESCRIPTION

I. Computer Program Test Suite Generation System

A. Overview

Referring to FIG. 1, a functional block diagram of a system for generating a computer program test suite constructed in accordance with the present invention is shown. The test generation system (TGS) 10, as further described hereinbelow in FIG. 2A, receives as an input a computer program expressed as original source code 11 and automatically generates as an output a test suite database 12. The test suite database contains sets of trial inputs 28 (shown in FIG. 2A) that can be used in test suite execution validation, regression testing or in other computer program evaluative tasks for detecting bugs and other problems with a computer program's structure or operation.

The original source code 11 is preferably organized into files, such as shown by way of example in FIG. 4A (as further described hereinbelow), which are stored on a secondary storage device (not shown). The original source code 11 contains a series of programming language instructions that can be understood by the TGS 10. In the described embodiment, the C programming language is supported, although support of other programming languages is feasible.

The original source code 11 comprises all types of files used to express an uncompiled, that is, non-object code, computer program, including definitional and declarative files. For example, in the C programming language, header files are declarative files since they frequently declare but do not define program variables, structures and functions. Source code files, however, are definitional files since they typically contain definitions of program variables, structures and functions.

The test suite database 12 contains two types of data (shown in FIG. 2A): a set of inputs 28 and flow and coverage information 29. The set of inputs 28 forces the program under test to execute different parts of the source code, including branch conditions, and substantially exercises the program's functionality. The TGS 10 generates the set of inputs 28 such that a desired coverage criteria is satisfied if the program under test is run through substantially all of the sets of inputs 28. As further described hereinbelow in FIGS. 6A, 6B and 6C, each set of inputs 28 is added to the test suite database 12 to increase the overall code coverage and satisfy a required testing criteria, such as statement, branch, segment, data or total path coverage or any other testing criteria conventional in the art.

One common coverage criteria is branch coverage which requires substantially all code branches in the original source code 11 to be covered. The flow and coverage information 29 is used for determining whether the selected criteria has been satisfied and for indicating where problems encountered during program execution exist in the original source code 11.

Figure 2A:
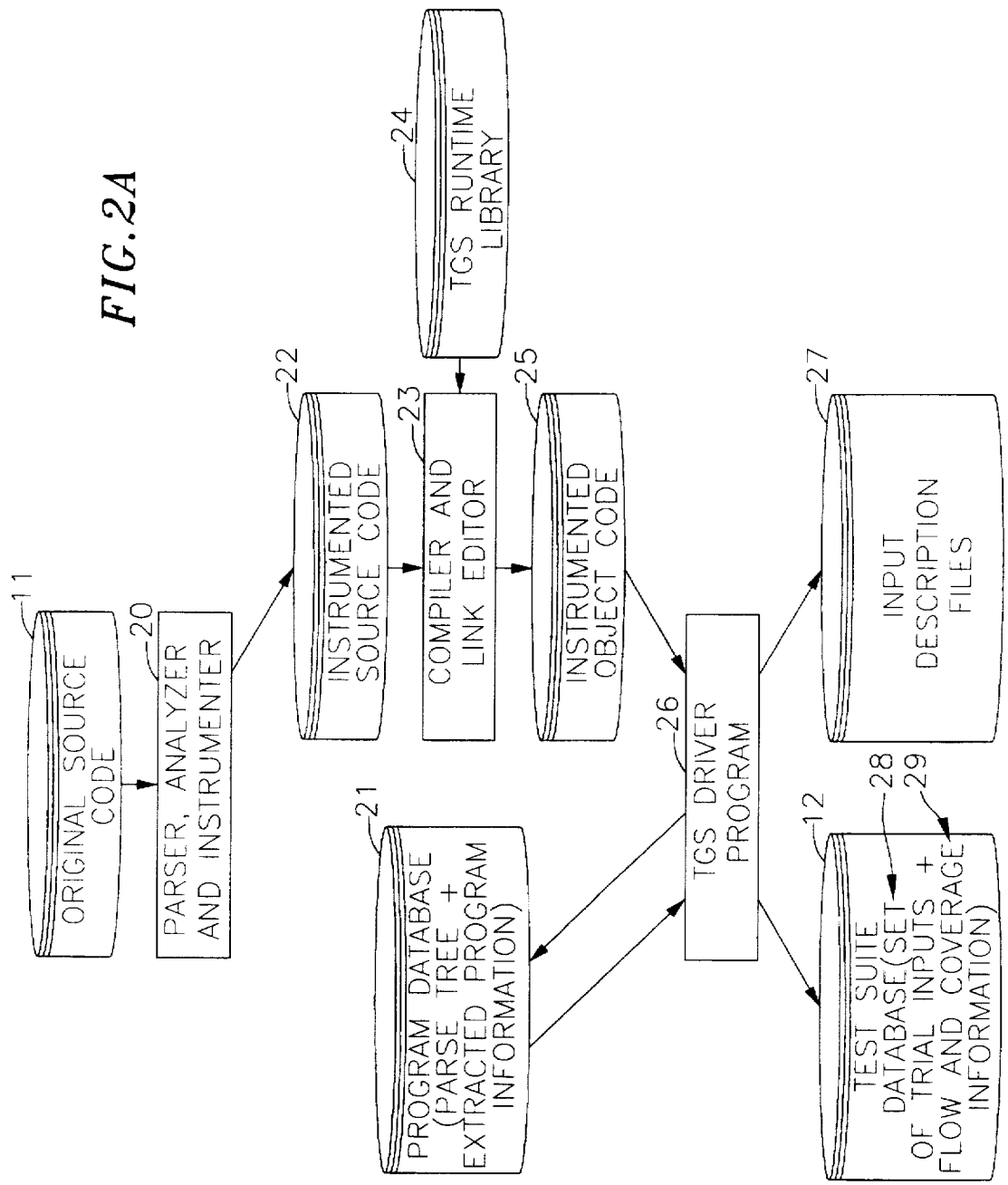
FIG. 2A is a functional block diagram of the test generation system of FIG. 1.

Referring to FIGS. 2B, 2C and 2D, the contents of the program database 21 (shown in FIG. 2A) are shown, by way of example, for a source code listing of an original computer program shown in FIG. 3B (as further described hereinbelow).

FIG. 2B is a data structure for storing a parse tree which describes the syntactic structure of the original computer program. It comprises a hierarchical representation of the instructions making up the original computer program beginning at line 1 of FIG. 4A expressed in a top-down manner, although any other form of parse tree is equally acceptable.

FIGS. 2C and 2D are data structures for storing flow and coverage information 29. FIG. 2C is a data structure for storing input statements extracted from the original computer program. In this example, the original computer program contains the single input statement "c=getchar ( );" on line 5 of FIG. 4A which calls the function getchar for obtaining a single input character. This input statement is stored on line 2 of the data structure of FIG. 2C and is assigned a key "5–[0/2]."

FIG. 2D is a data structure for storing block and branch analysis information extracted from the original computer program. Each program is broken down into a series of code blocks comprising one or more program statements occurring along a single path of execution. A branch condition causes a break in execution flow and results in two or more code blocks being formed. In this example, six code blocks are formed as shown in Table I below.

TABLE I

| Block # | Lines | Key | Original Source Code Lines |
|---|---|---|---|
| 1 | 3–8 | [5:7] | 5–7 |
| 2 | 11–13 | [8:8] | 8 |
| 3 | 15–17 | [9:9] | 9 |
| 4 | 20–22 | [10:10] | 10 |
| 5 | 24–26 | [12:12] | 12 |
| 6 | 28–31 | [14:14] | 14 |

As shown in Table I, each code block comprises several lines in the data structure of FIG. 2D and is assigned a key identifying the corresponding lines in the original computer program of FIG. 4A.

In the described embodiment, the TGS 10 is a computer program written in the C programming language, although other programming languages are feasible. The TGS 10 is executed by a general purpose programmed computer system (not shown) which operates on sets of instructions in the form of computer programs. Such a general purpose programmed computer system contains a central processing unit, volatile memory, secondary storage devices and other components conventional in the art. It is also envisioned that the TGS 10 can be embodied as a special purpose computer formed on an integrated circuit chip (or set of chips) or as executable computer code burned into a read-only memory (ROM) chip that can be read by conventional means or as micro code. An exemplary example of a TGS 10 is the TEST GENERATION SYSTEM product licensed by Parasoft Corporation, Monrovia, Calif.

B. Test Generation System Structure

Referring to FIG. 2A, a functional block diagram of the TGS 10 of FIG. 1 is shown. The original source code 11 is first processed by a parser, an analyzer and an instrumentor (block 20). The parser is conventional in the art and is used to generate a parse tree. The analyzer is also conventional in the art and is used to analyze and extract program information. Both the parse tree and the extracted program information are stored in the program database 21. The instrumentor introduces instrumentation function calls into the original source code 11 for use by the TGS 10 during test suite generation and to create instrumented source code 22, as further described hereinbelow in FIG. 3.

Next, the instrumented source code 22 is processed by a compiler and link editor (block 23). Both the compiler and link editor are conventional in the art and are used to generate instrumented object code 25. The link editor links in the instrumentation functions stored in a TGS run-time library 24 containing a library of linkable object modules corresponding to the instrumentation function calls introduced by the instrumentor (block 20).

The TGS driver program 26 access information in the program database 21 and uses it to find a set of inputs 28 for the program under test, as further described hereinbelow in FIG. 5. The TGS driver program 26 repeatedly executes the instrumented object code 25 and analyzes the output from each execution run to determine whether each trial set of inputs 28 results in additional code coverage. The TGS driver program 26 stores any additional program information learned during each execution run into the program database 21, each new set of inputs 28 and flow and coverage information 29 into the test suite database 12 and a corresponding description of the new set of inputs 28 into an input description file 27. In the described embodiment, each set of inputs 28 is stored in an individual file with a corresponding input description file 28 stored separately as further described hereinbelow in FIGS. 6B and 6C.

C. Original Source Code Instrumentation

Figure 3:
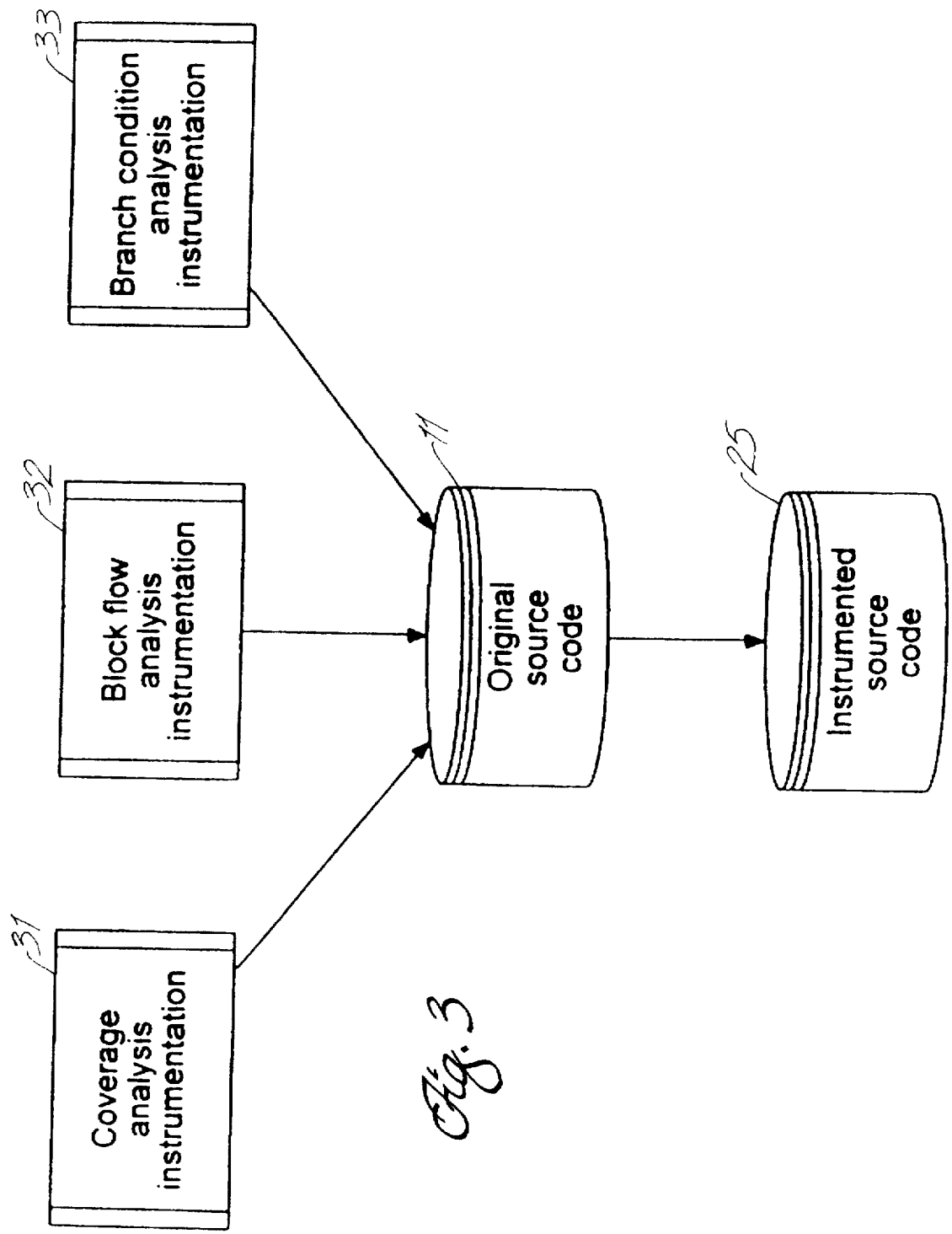
FIG. 3 is a functional block diagram of source code instrumentation.

Referring to FIG. 3, the instrumentor (block 20) introduces three types of instrumentation function calls into the original source code 11. These will be explained with further reference to FIGS. 4A and 4B which show, by way of example, a source code listing of an original source code 11 program and a corresponding source code listing of an instrumented source code 25 program, both written in the C programming language.

The first type of instrumentation is coverage analysis instrumentation 31 which enables the TGS 10 (shown in FIG. 1) to keep track of which code blocks of the program under test have been executed. For example, the instrumentation statement "__Insight__cov__ptr[0]=1;" on line 12 of FIG. 4B indicates that the code block running from lines 1 through 4 of FIG. 4A have been executed.

The second type of instrumentation is block flow analysis instrumentation 32 which enables the TGS 10 (shown in FIG. 1) to keep track of the control flow of the program under test. For example, the instrumentation statement "__Insight__tgs__block(0, 5, 0);" on line 13 of FIG. 4B indicates that the statement on line 5 of FIG. 4A has been reached.

The third type of instrumentation is branch condition analysis instrumentation 33 which enables the TGS 10 (shown in FIG. 1) to keep track of the values obtained while executing the program under test. This type of instrumentation transforms branch conditions in the original source code 11 into a form suitable for input generation. For example, the instrumentation statements "__Insight__1=__Insight__tgs__bc(0, (double) c–(double) 'a', 3); if (__Insight__1) { . . . " on lines 16 through 21 of FIG. 4B transforms the branch condition "if (c=='a')" on line 7 of FIG. 4A into a form usable by the TGS 10 for test suite generation. Other types of analysis instrumentation are feasible for satisfying different testing criteria.

After instrumentation, the instrumented source code 22 results in source code which is equivalent to the original source code 11 but containing additional instrumentation function calls.

II. TGS Driver Program Structure and Operation

A. Structure

Referring to FIG. 5, a functional block diagram of the TGS driver program 26 is shown. It consists of four modules: execution module 40, decision module 41, symbolic execution module 42 and input generation module 43.

The decision module 41 coordinates the operations performed by the other modules comprising the TGS driver program 26. It accesses the program database 21 to obtain parse tree and program information regarding the program under test and stores sets of inputs 28 into the test suite database 12 and input set information into the input description files 27.

The execution module 40 executes the instrumented object code 25 according to instructions received from the decision module 41. It analyzes the output from the program under test after each execution run and passes analysis information back to the decision module 41.

The symbolic execution module 42 performs static and dynamic symbolic executions of the program under test according to instructions received from the decision module 41. It passes analysis information back to the decision module 41.

The input generation module 43 generates a set of inputs 28 for the program under test using information passed to it by the decision module 41. It passes a trial set of inputs 28 back to the decision module 41.

B. Operation

Figure 6A:
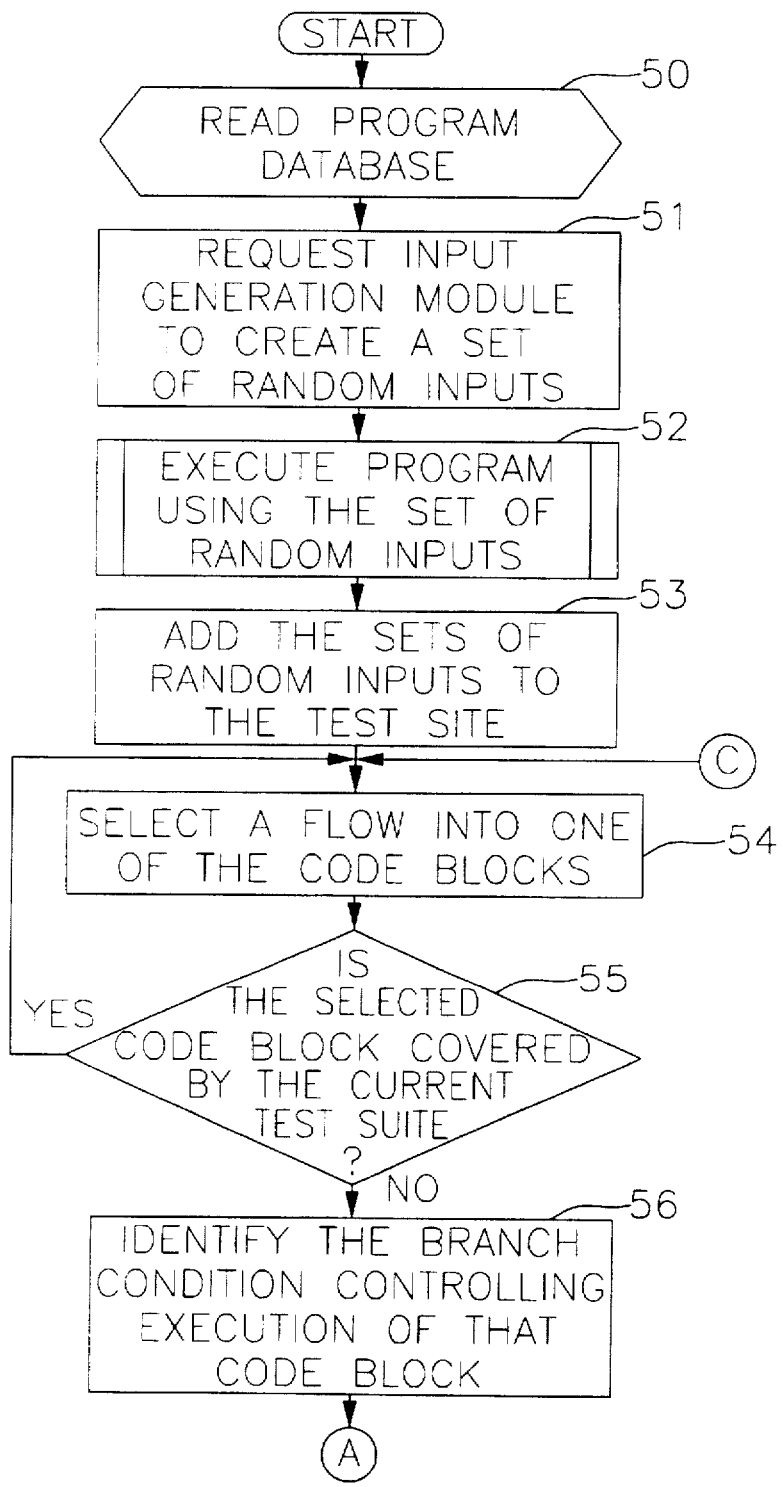
FIGS. 6A, 6B and 6C are a flow diagram of a method for generating a computer program test suite in accordance with the present invention.
Figure 6B:
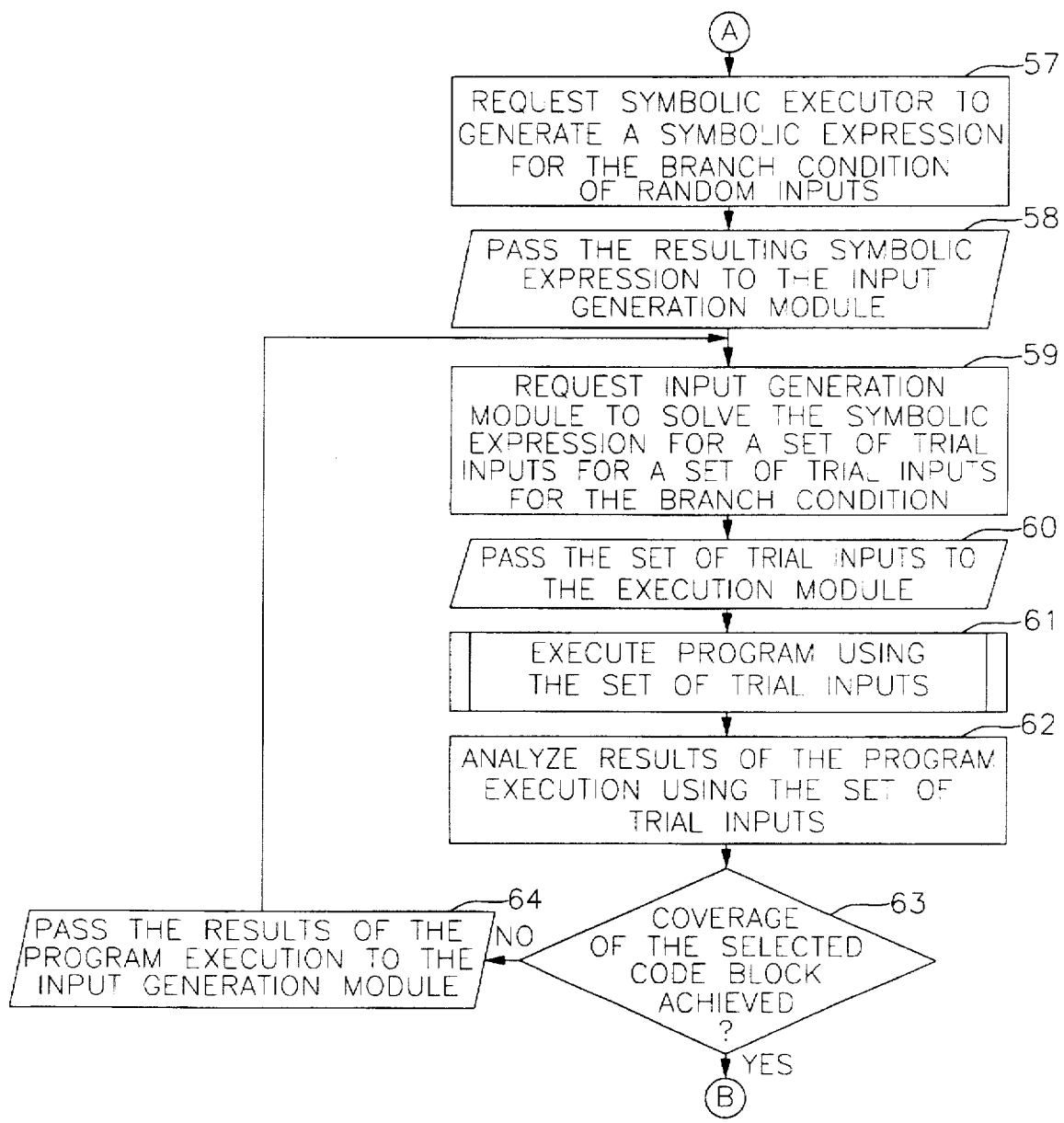
Figure 6C:
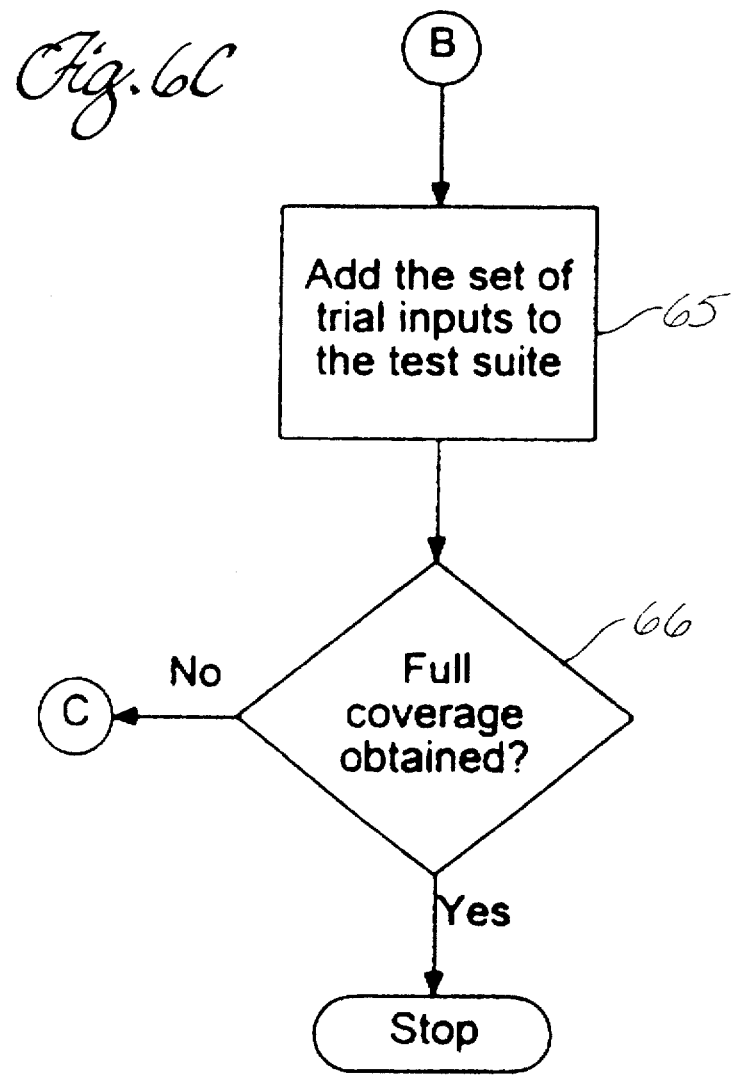

Referring to FIGS. 6A, 6B and 6C, a flow diagram of a method using the TGS driver program 26 for generating a computer program test suite in accordance with the present invention is shown. Initially, the TGS driver program 26 generates a random set of inputs 28 providing basic code coverage of the program under test (blocks 51-53). Then, the TGS driver program 26 iteratively processes each of the code blocks in the original source code 11 using a pair of nested control loops. The outer control loop (blocks 54-66) iterates until coverage of substantially every code block has been obtained. The inner control loop (blocks 59-63) iterates until a set of inputs 28 has been found that covers a selected individual code block.

Upon invocation of the TGS program driver 26, the decision module 41 reads the program database 21 to obtain the parse tree and information regarding the program under test (block 50). The decision module 41 requests the input generation module 43 to create a trial set of inputs 28 using the random input generation module 71 (block 51) as further described hereinbelow in FIG. 7.

Once a random set of inputs 28 has been generated, the execution module 40 executes the instrumented object code 25 using the random set of inputs 28 (block 52) per instructions from the decision module 41. Only independent random sets of inputs 28 are added to the test suite database 12 (block 53). These are sets of inputs 28 that result in code coverage different from that obtained with any of the other sets of inputs 28 already present in the test suite database 12.

A flow into one of the code blocks of the instrumented source code 22 is selected by the decision module 41 (block 54). The goal of this step is to identify a code block in the original source code 21 not covered by one of the sets of inputs 28 currently in the test suite database 12. If the selected code block is covered by one of the sets of inputs 28 currently in the test suite database 12 (block 55), a new code block is selected (block 54). Otherwise, if the selected code block is not covered (block 55), the decision module 41 identifies the branch condition controlling the execution of that code block (block 56) using the parse tree stored in the program database 21.

The decision module 41 requests the symbolic execution module 42 to generate a symbolic expression for the branch condition (block 57) as further described hereinbelow in FIG. 14. The resulting symbolic expression is passed to the input generation module 43 by the decision module 41 (block 58). The decision module 41 requests the input generation module 43 to solve the symbolic expression for a trial set of inputs 28 that satisfy the identified branch condition (block 59).

The decision module 41 passes the trial set of inputs 28 to the execution module 40 (block 60) which executes the instrumented object code 25 using that trial set of inputs 28 (block 61). The execution module 40 analyzes the results of the execution run and passes back those results to the decision module 41 (block 62).

If coverage of the selected code block has not been achieved by using the trial set of inputs 28 as determined by the execution module 40 (block 63), the results of the execution run by the execution module 40 are passed to the input generation module 43 (block 64) for use in the generation of another trial set of inputs 28 (block 59) at the top of the inner control loop (blocks 59-63). Otherwise, if coverage of the selected code block has been achieved (block 63), the trial set of inputs 28 is added to the test suite database 12 (block 65).

If full coverage of substantially all code blocks in the program under test has not been obtained (block 66), control returns to the top of the outer control loop (blocks 54-66) for selection of another code block not already covered by one of the sets of inputs 28 currently in the test suite database 12. Otherwise, if full coverage has been obtained (block 66), the TGS driver program 26 terminates since it is no longer necessary to generate further sets of inputs 28.

III. Input Generation Modules

A. Structure

Referring to FIG. 7, a functional block diagram of the input generation module 43 is shown. It operates in response to a request for a trial set of inputs 28 from the decision module 41 (block 70). The input generation module 43 comprises four submodules: random input generation module 71, solver module 72, guided function minimization (GFM) module 73 and heuristics module 74. The random input generation module 71 generates a set of random inputs using a pseudo random number generator, such as described in D.C. Ince, *The Automatic Generation of Test Data*, 30 The Computer Journal 1, pp. 63-69 (1987), the disclosure of which is incorporated herein by reference.

The heuristics module 74 contains a set of rules (not shown) that can be invoked by the random input generation module 71 to generate a random input chosen in such a way that the input has an increased chance of forcing more coverage of the program under test.

The solver module 72 generates an input for solving a specific symbolic expression in response to the decision module 41 which passes the symbolic expression as an input parameter to the input generation module 43. The solver module 72 finds an input that solves the specific symbolic expression for a path condition that leads to a desired branch of the currently selected code block.

The GFM module 73 enables the TGS 10 to solve for an input using guided function minimization methods, such as described in B. Korel, *Automated Software Test Data Generation*, 16 IEEE Trans. on Software Engineering 8, pp. 870-879 (1990), the disclosure of which is incorporated herein by reference. These methods avoid requiring knowledge of the functional form of the equation to be solved and only require that the output be calculable for any given input. The GFM module 73 is used in two cases. First, the solver module 72 uses the GFM module 73 to find a solution for a symbolic expression too complicated for it to solve itself. Second, the decision module 41 uses the GFM module 73 for finding an input when no symbolic expression can be calculated for the desired code branch. In the latter case, the functional form for the dependence of the branch condition on its inputs is unknown. Consequently, the program under test must be repeatedly executed to determine what values the branch condition takes on for different inputs.

Upon the generation of a trial set of inputs 28, the input generation module 43 outputs from the appropriate submodule (block 75) the trial set of inputs 28 into the test suit database 12 along with a corresponding input description file 27.

Referring to FIGS. 8A and 8B, a collection of input files 76a, 76b, 76c containing, by way of example, sets of inputs 28 and a collection of files 77a, 77b, 77c containing corresponding input description files 27 generated by the TGS 10 for the original computer program of FIG. 4A are shown. In the examples shown, each set of inputs 28 contains a single value which is an input to the program statement "c=getchar ( );" in line 5 of FIG. 4A. For instance, the input file 76a contains Input Set #1 comprising an input character "j." However, other computer programs requiring several input values would have a set of inputs 28 containing one value per input program statement.

Each input description file 27 contains detailed information about the type of input generated and the statement in the original source code 11 to which it corresponds. For instance, the file 77a contains Input Description File #1 comprising "1–[0\2]: size=4, value=106 'j'." The value "1" indicates the block number corresponding to that input value. The "[0\2]" value is a key into the program database 21 indicating the statement that generated that input in the original source code 11. The size field indicates the size in bytes of the input generated. The value field indicates the value generated and corresponds to one of the set of inputs 28 contained in the corresponding input file 76a, 76b, 76c.

B. Operation

Figure 9:
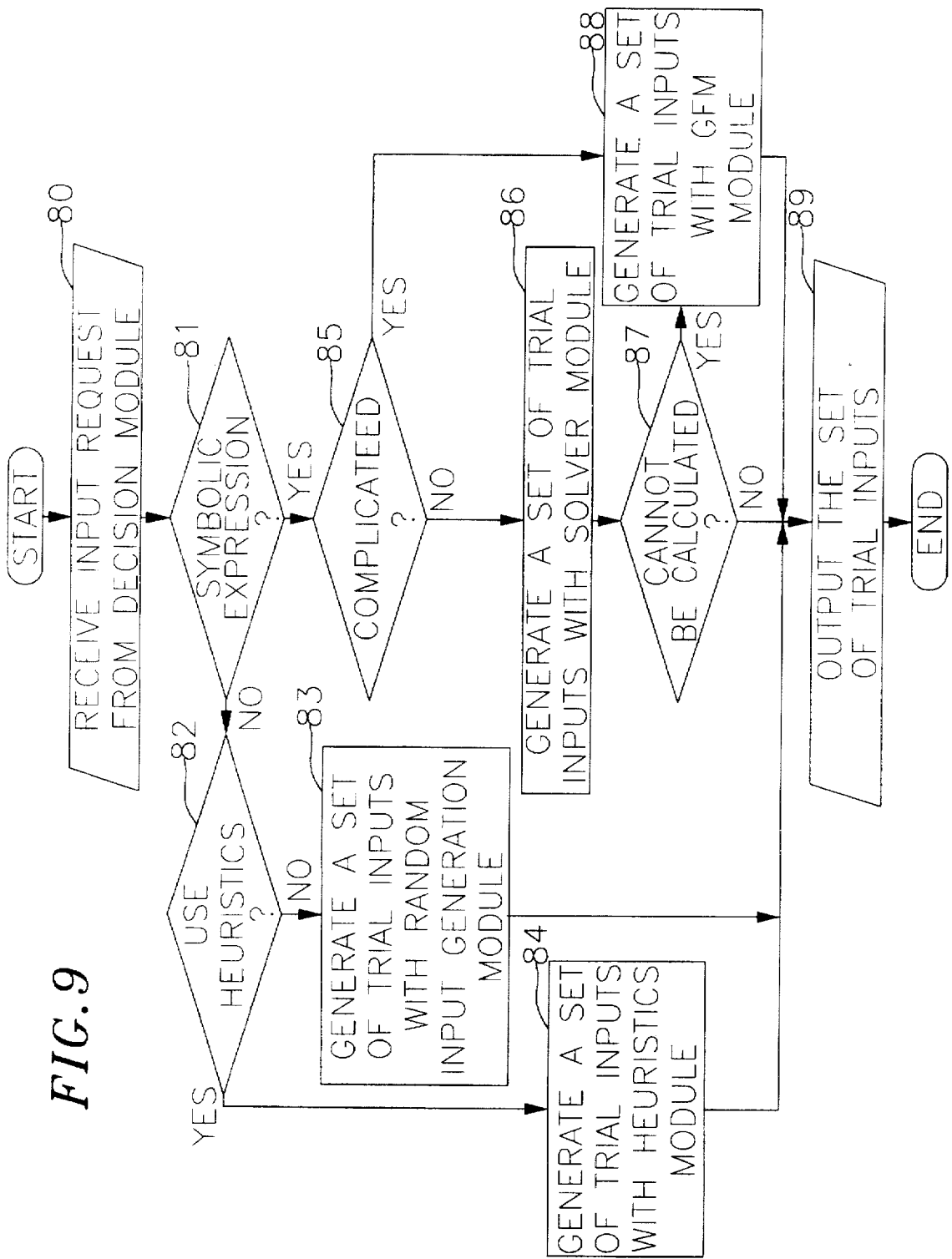
FIG. 9 is a flow diagram of a function for processing an input request using the input generation module of FIG. 5.

Referring to FIG. 9, a flow diagram for a function for processing an input request using the input generation module 43 is shown. An input request is received by the input generation module 43 from the decision module 41 (block 80). If the input request is not for an input satisfying a symbolic expression (block 81), two paths can be taken. First, if the use of heuristics is not specified (block 82), a trial set of inputs 28 is generated by the random input generation module 71 (block 83). Otherwise, if the use of heuristics is specified (block 82), a trial set of inputs 28 is generated by the heuristics module 74 (block 84).

If the input request is for an input satisfying a symbolic expression (block 81) yet the symbolic expression is not complicated (block 85), a trial set of inputs 28 is generated by the solver module 72 (block 86). However, if the solver module 72 is unable to calculate a solution (block 87), the solver module 72 forwards the input request to the GFM module 73 which will generate a trial set of inputs 28 based on that symbolic expression (block 88).

Once a trial set of inputs 28 has been generated by one of the submodules comprising the input generation module 43 (blocks 83, 84, 86, 88), the trial set of inputs 28 is output into the test suite database 12 along with a corresponding input description file 27 (block 89). The function then terminates.

IV. Symbolic Execution Module
A. Overview

Figure 10:
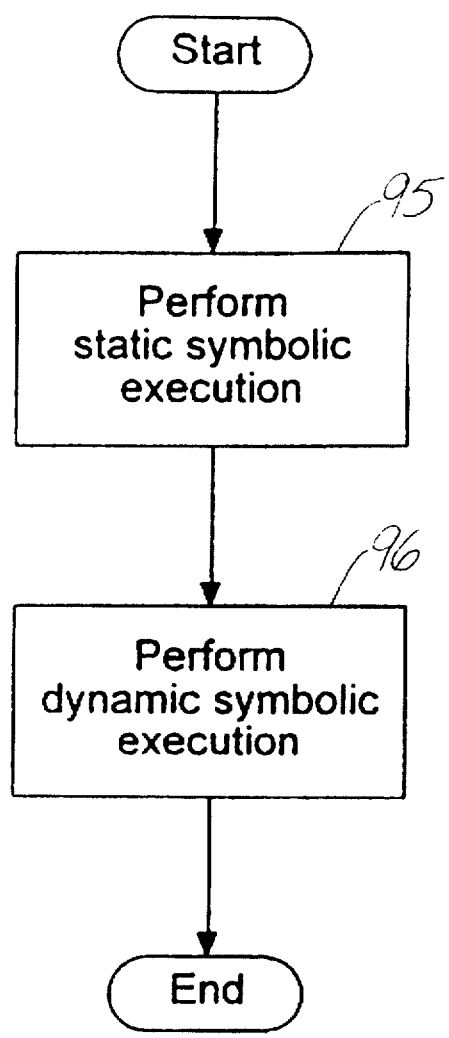
FIG. 10 is a flow diagram of a function for generating a symbolic expression in accordance with the present invention.

The use of a trial set of inputs 28 based solely on pseudo random numbers is insufficient in most cases for obtaining full branch code coverage. Consequently, the present invention employs symbolic execution to generate a symbolic expression that fully describes the dependence of the branch condition on the inputs of the program under test as follows with reference to FIG. 10 which is a flow diagram of a function for generating a symbolic expression in accordance with the present invention.

First, a static symbolic execution is performed for the complete program (block 95). This static symbolic execution consists of a single sweep over the full program and generates a symbolic expression for a few of the path conditions. This static symbolic execution only gives a symbolic expression for those branch conditions that have a simple dependence on the inputs to the program under test. Consequently, static symbolic execution is useful only for those programs not having an appreciable size.

It is important to generate a symbolic expression for as many branch conditions in the program under test as possible. To do this, dynamic symbolic execution is performed (block 96) as further described hereinbelow in FIG. 13. A dynamic symbolic execution is like a normal interpretation of the program under test but uses symbolic values for the inputs to the program instead of actual values.

The dynamic symbolic execution is performed along the path taken by an actual execution of the program under test which corresponds to some set of inputs 28 in the test suite database 12. Symbolic expressions can then be used to generate new sets of inputs 28 based on those existing sets of inputs 28 and chosen in such a way as to increase the coverage of the test suite database 12.

B. Structure

Figure 11:
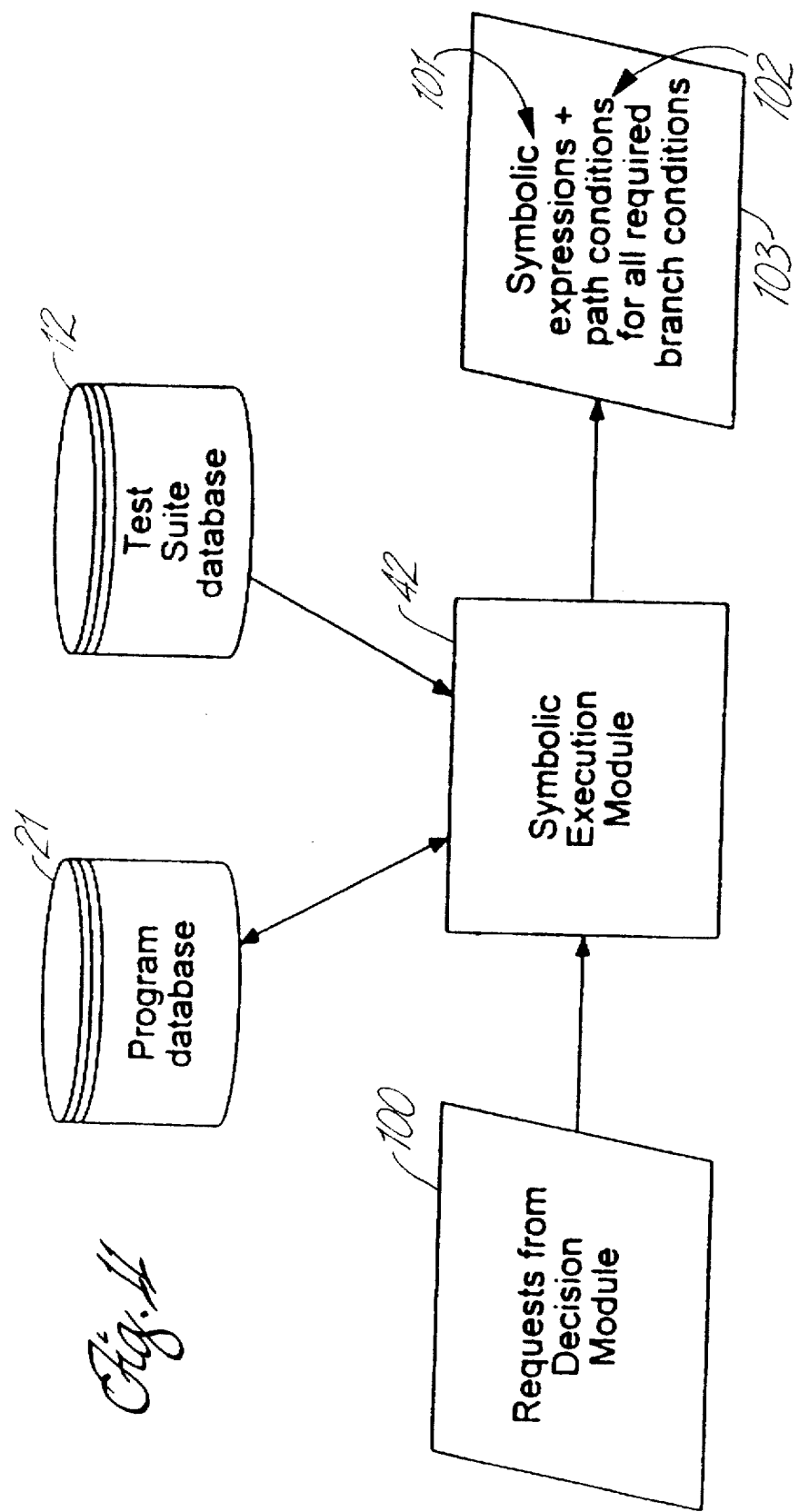
FIG. 11 is a functional block diagram of the symbolic execution module of FIG. 5.

Referring to FIG. 11, a functional block diagram of the symbolic execution module 42 of FIG. 5 is shown. The purpose of the symbolic execution module 42 is to perform a symbolic execution of the program under test. Requests for symbolic executions are received from the decision module 41 (block 100). The symbolic execution module 42 symbolically interprets the program under test using information stored in the program database 21 and the test suite database 12. Upon completion, symbolic expressions 101 and associated path conditions 102 are output by the symbolic execution module 42 for all required branch conditions (block 103).

Figure 12:
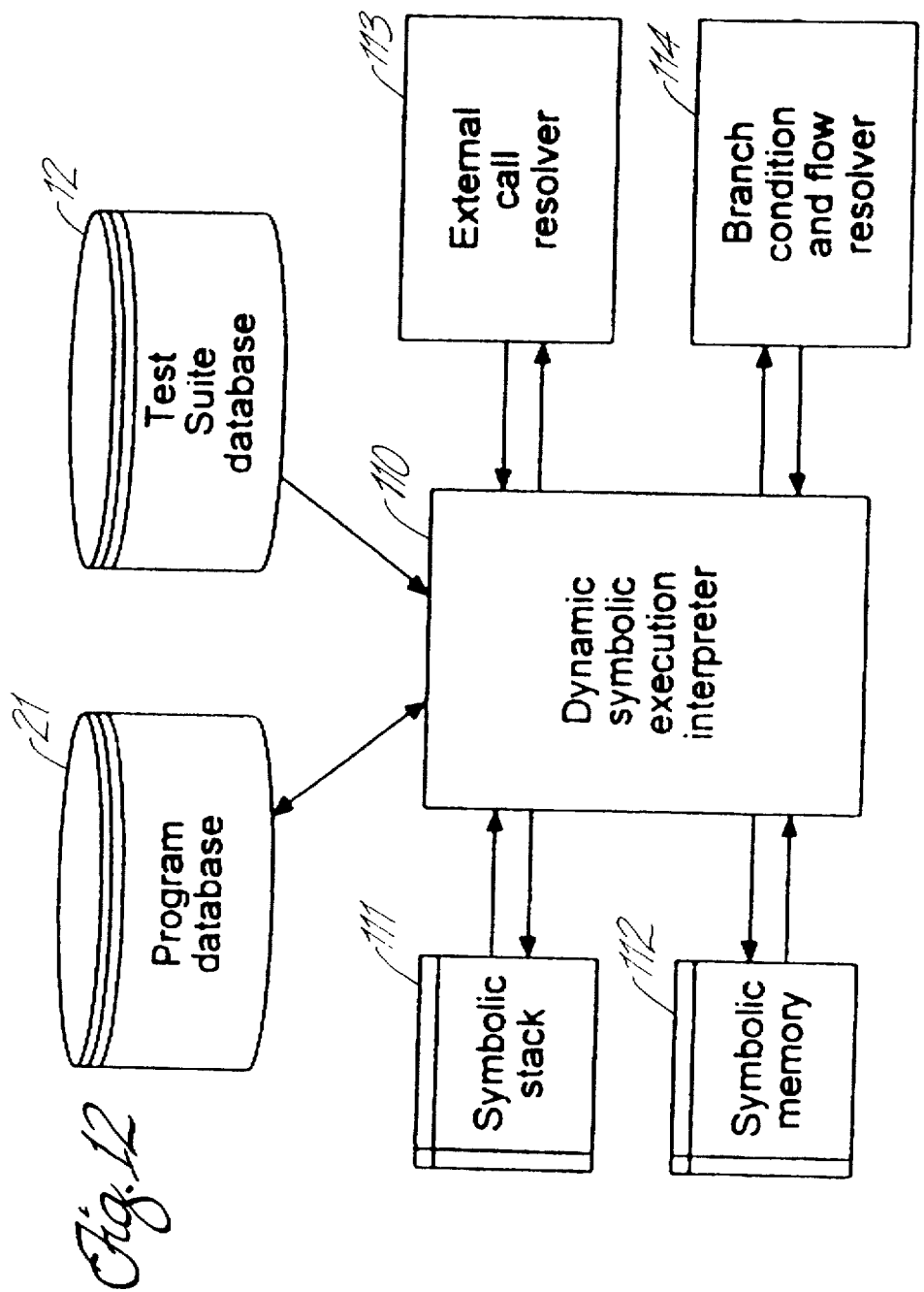
FIG. 12 is a functional block diagram of the components comprising the symbolic execution module of FIG. 5.

FIG. 12 is a functional block diagram of the five components comprising the symbolic execution module 12 of FIG. 5. The components include: dynamic symbolic execution interpreter 110; symbolic stack 111; symbolic memory 112; external call resolver 113; and branch condition and flow resolver 114.

The dynamic symbolic execution interpreter 110 is the main component coordinating the dynamic symbolic execution of the program under test. It performs a function similar to an interpreter but instead of assigning real values to each program variable, it assigns symbolic values to each program variable. Symbolic values are expressions expressed as a function of the inputs to the program under test as further described hereinbelow in Section V. The dynamic symbolic execution interpreter 110 symbolically executes the program under test using a parse tree, such as shown in FIG. 2B, stored in the program database 21 and the sets of inputs 28 and flow and coverage information 29 stored in the test suite database 12.

The dynamic symbolic execution interpreter 110 employs two temporary memories: symbolic stack 111 and symbolic memory 112. The symbolic stack 111 is a pushdown stack as conventional in the art used for storing the activation records (not shown) for currently called functions. The symbolic memory 112 stores all values used by the program under test as input variables and program variables in symbolic form, as further described hereinbelow in Section V.

The dynamic symbolic execution interpreter 110 employs for performing specialized functions: external call resolver 113 and branch condition and flow resolver 114. The external call resolver 113, further described hereinbelow in FIG. 15, handles all function calls whose source code is not contained as a part of the original source code 11. These include, for instance, system calls and calls to external function libraries. The branch condition and flow resolver 114, further described hereinbelow in FIG. 14, determines the next program instruction to be executed based on information on actual execution runs stored in the test suite database 12.

C. Operation.

Figure 13:
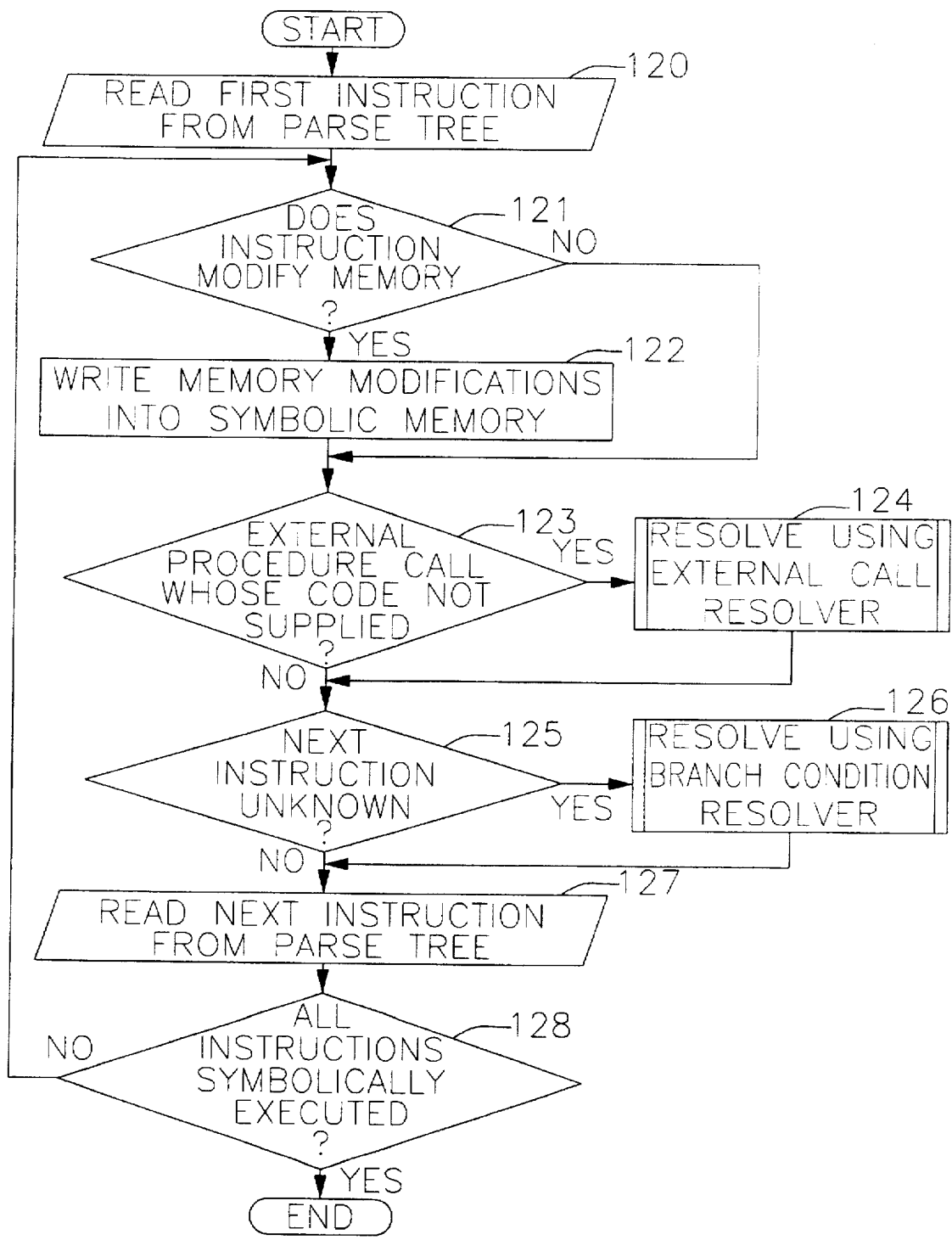
FIG. 13 is a flow diagram of a method for performing dynamic symbolic execution in accordance with the present invention.

FIG. 13 is a flow diagram of a method for performing dynamic symbolic execution using the symbolic execution module 42 of FIG. 5, in accordance with the present invention. The dynamic symbolic execution interpreter 110 controls all symbolic execution. Preferably, the dynamic symbolic execution interpreter 110 discriminates between different program instructions and skips certain instructions for efficiency and time savings. This includes those time-consuming parts of the program under test that do not influence branch conditions of interest. The dynamic symbolic execution interpreter 110 symbolically executes the entire program under test even though non-dependent instructions are skipped for optimization (not shown). Dynamic symbolic execution is performed as follows with reference to the original computer program of FIG. 4A and its corresponding parse tree of FIG. 2B.

The dynamic symbolic execution interpreter 110 iteratively processes (blocks 121–128) the instructions comprising the program under test using a parse tree representation, such as the parse tree shown in FIG. 2A. The dynamic symbolic execution interpreter 110 begins by reading the first instruction from the parse tree (block 120). If the instruction modifies a memory location in a memory used by the program under test to store and retrieve data values (block 121), the memory modifications are written into the symbolic memory 112 in symbolic form (block 122). For example, in line 5 of FIG. 4A, the program statement "c=getchar ( )," is an assignment statement that assigns an input character obtained using the function getchar that is stored in the program variable c. Thus, this instruction modifies the memory of the program under test. The memory modification is expressed in symbolic form in the symbolic memory 112 as the statement "c=<int> <1–[0\2]>" where <int> indicates that the symbolic value for the program variable c is an integer and <1–[0\2]> is a key for an entry stored in the symbolic memory 112 representing the current input value.

If the original source code 11 includes an external procedure call whose source code is not supplied in the original source code 11 (block 123), that is, its program statements are unknown, the dynamic symbolic execution interpreter 110 calls the external call resolver 113 to resolve the symbolic expression (block 124), as further described hereinbelow in FIG. 15. This step is necessary because the parse tree only contains nodes corresponding to program statements supplied in the original source code 11. Thus, there are no nodes in the parse tree corresponding to external procedure calls whose source code is not supplied and consequently the dynamic symbolic execution interpreter 110 needs some procedure for symbolically executing these functions.

The dynamic symbolic execution interpreter 110 attempts to symbolically execute each instruction in the program under test in sequence. However, certain types of instructions cause a branch in the control flow and thereby make the next instruction unknown. For instance, conditional instructions, such as if or switch statements, or a loop condition test, such as in for or while statements, will cause a break in the control flow. Thus, if the next program instruction is unknown (block 125), the branch condition and flow resolver 114 is called by the dynamic symbolic execution interpreter 110 to resolve the next instruction to be performed (block 126), as further described hereinbelow in FIG. 14.

Once the next program instruction is known, the dynamic symbolic execution interpreter 110 reads that instruction from the parse tree (block 127). If all program instructions have not been symbolically executed (block 120), control returns to the top of the control loop (blocks 120–121) for processing of the next program instruction. Otherwise, the program ends.

Figure 14:
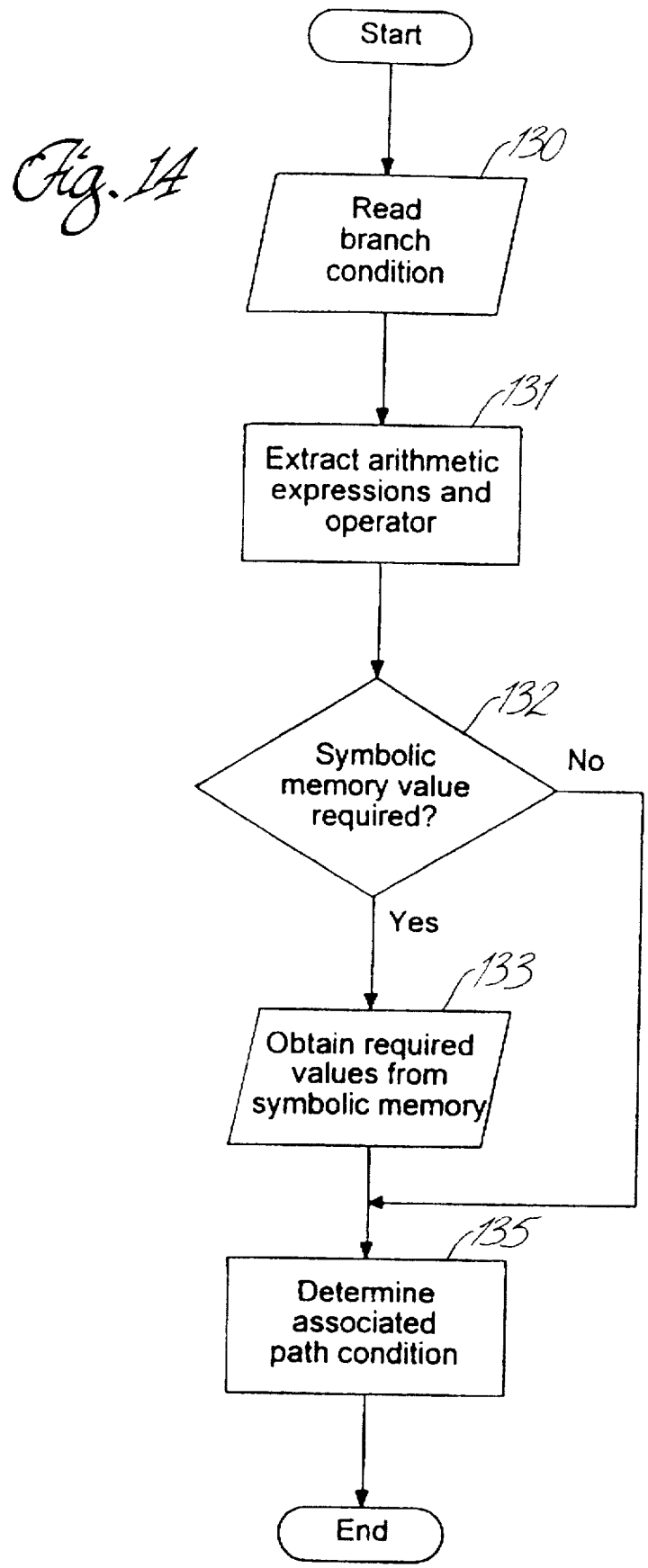
FIG. 14 is a flow diagram of a function for resolving a branch condition.

FIG. 14 is a flow diagram of a function for resolving a branch condition using the branch condition and flow resolver 114 of FIG. 12. Its purpose is to generate a symbolic expression 101 and a corresponding path condition 102 for the branch condition being resolved.

The branch condition is read by the branch condition and flow resolver 114 (block 130) and arithmetic expressions and an operator are extracted from the branch condition (block 130). For example, in line 9 of FIG. 4A, the branch condition in the program statement "else if (c=='b')" contains two arithmetic expressions, c and 'b', and one operator, the equality operator ==.

The branch condition and flow resolver 114 then examines each of the arithmetic operators to determine whether a symbolic memory value is required (block 132) and if so, obtains it from the symbolic memory 112 (block 133). In this example, the program variable c requires a symbolic memory value and the corresponding symbolic memory value <int> <1–[0\2]> is obtained from the symbolic memory 112. The arithmetic expression corresponding to the character constant 'b' does not require a symbolic memory value.

The main purpose of the branch condition and flow resolver 114 is to determine the next instruction that needs to be executed in case the dynamic symbolic execution interpreter 110 cannot calculate the value of the symbolic expression. This can happen, for example, if certain calculations have been skipped for optimization purposes.

If a symbolic expression for a branch condition can be calculated, the dynamic symbolic execution interpreter 110 will just calculate the next instruction to be executed by replacing the symbolic inputs with the actual inputs to the symbolic expression.

The branch condition and flow resolver 114 can also calculate the next instruction to be executed by looking at the actual flow of the program under test. If an actual execution corresponding to some set of inputs 28 in the test suite database 12 is being followed, the corresponding flow and coverage information 29 for that set of inputs 28 can be used to decide which statement to execute next.

FIG. 15 is a functional block diagram of the external call resolver 113. This module is used by the dynamic symbolic execution interpreter 110 whenever the parse tree for the program under test does not contain nodes corresponding to an external procedure call made in the original source code 11. The external call resolver 113 employs two methods using an internal symbolic run-time library 141 and a mapper to direct calls 142.

In operation, the external call resolver 113 receives a request for an external procedure call resolution with its input arguments (block 140). It determines the actions that the procedure call takes and returns the symbolic memory values mapped into the symbolic memory 112 (block 143).

The internal symbolic run-time library 141 contains commonly used functions, such as system calls and calls to external function libraries. It works with symbolic memory values stored in the symbolic memory 112. The internal symbolic run-time library 141 produces a symbolic expression that replaces the received input arguments with their corresponding symbolic memory values and the external procedure call with its matching commonly used function from the internal symbolic run-time library 141. The symbolic expression is returned to the dynamic symbolic execution interpreter 110.

The mapper to direct calls 142 maps symbolic input arguments for an external procedure to actual non-symbolic arguments (not shown) and calls the actual procedure for execution. The returned values from the actual procedure call are mapped back to their respective symbolic memory values in the symbolic memory 112 and are returned to the dynamic symbolic execution interpreter 110.

V. Symbolic Memory

The symbolic memory 112 stores symbolic memory values corresponding to actual program values used in the program under test. It employs the same format as used for a parse tree, such as the parse tree shown in FIG. 2A. Four additional nodes are used: TGS_NODE, TGS_MEMORY, TGS_RT_POINTER and TGS_CELL. Each item in the symbolic memory 112 corresponding to an input of the program is identified by a unique key, such as the key "1–[0\2]" shown in the input description file 77a of FIG. 8B. Unique keys are assigned to all input statements.

A memory location in the symbolic memory 112 consists of two items: type information for identifying the type of data stored, e.g., integer data, and the symbolic value itself. The latter is stored as a subtree.

The types of representations used for storing actual program values in symbolic form as symbolic memory values in the symbolic memory 112 will now be described.

A. Constant Values

Constant values are represented in the symbolic memory 112 by the same parse tree nodes as used for representing constant values in the original source code 11.

For example, consider the symbolic memory value for a program variable var defined by the program statement:

int var;

After symbolically executing an assignment statement:

var=5;

var is stored in the symbolic memory 112 as a symbolic program statement:

var=<int> 5;

This corresponds to the parse tree nodes:

542-cons.integer=5; type=114;

114—integer <int>

B. Symbolic Expressions Dependent on Input Values

A TGS_NODE node is used in the symbolic memory 112 for representing the dependence of the symbolic memory value on an input value.

For example, consider the symbolic memory value for the program variable var after symbolically executing a scanf program statement:

scanf ("%d", &var);

which assigns an input value to its memory address and after symbolically executing another assignment statement:

var=var+3;

Var is stored in the symbolic memory 112 as a symbolic program statement:

var=<int> [tgs_node]+3;

where [tgs_node] is the TGS_NODE that represents the input value assigned in the scanf program statement. This corresponds to the parse tree nodes:

586-addition type=114; [] ops = 585; 168;
114—integer <int>
585—tgs_node type=114; [] key = 2, index = 1,
elem = –1
168—cons.integer = 3; type=114;

C. Arrays

A TGS_MEMORY node is used by the symbolic memory 112 for representing an array. Each TGS_MEMORY node contains a list of cells represented by TGS_CELL nodes. Each cell contains an array index and corresponding value.

For example, consider the symbolic memory value for a program variable arr defined as an array by the program statement:

int arr [5], ind;

After symbolically executing the assignment statements:

arr [1]=10;

arr [2]=20;

and after symbolically executing scanf program statements:

scanf ("%d", &ind);

scanf ("%d", &arr [ind]);

which assign input values to respective memory addresses. Arr is stored in the symbolic memory 112 as symbolic program statements:

arr =   <int  [5]> [20 bytes = 5 cells * 4 bytes] - {
        <int>  [1] = <int> 10
        <int>  [2] = <int> 20
        <int>  [<[0\4]>] = <int> <[0\6]>
};

This corresponds to the parse tree nodes:

601-tgs_memory type=542; sizeof = 20 tgs_node=602;
[] cells=622;
  542—array type=114; sizeof = 20 max=541;
  541—cons.integer = 5; type=114; sizeof = 4
  114——integer <int> sizeof = 4
  622—tgs_cell index=613; value=623;

D. Structures

Structures are represented in the symbolic memory 112 in a manner similar to that used for arrays. The only difference is that the index used for identifying each cell is replaced by a structure member name.

For example, consider the symbolic memory value for a program variable rec defined as a structure by the program statement:

```
struct {
    int len;
    char *str;
} rec;
```

After symbolically executing the assignment statements:

rec.len=3;
rec.str="abc";

Rec is stored in the symbolic memory 112 as symbolic program statements:

```
rec = <struct {}> [8 bytes] - {
        <int> [len] = <int> 3
        <char *> [str] = <char *> "abc"
      }
```

These correspond to the parse tree nodes:

```
581-tgs_memory type=540; sizeof = 8 tgs_node=584;
[] cells=582;
    540--struct name=<null> sizeof = 8 fields=542;
next=550;
    542----field_decl name=len [tst.c:4] type=114;
next=545;
        114-----integer <int>
    545----field_decl name=str [tst.c:5] type=544;
        544-----pointer type=110;
        110-----char
    582---tgs_cell index=541; value=168;
        541----identifier = len;
        168----cons.integer = 3; type=114;
    583---tgs_cell index=543; value=555;
        543----identifier = str;
        555----cons.string = "abc"; type=556;
        556-----pointer type=110;
```

While various embodiments of the invention have been particularly shown, it will be understood by those skilled in the art that various changes in form and detail may be made without departing from the scope and spirit of the present invention, wherein:

What is claimed is:

1. A method using a computer for generating a test suite for a computer program, the computer program comprising program statements and program variables, including at least one input statement having one or more input variables, grouped into code blocks and stored in a program database, the test suite comprising sets of inputs, each of the sets of inputs corresponding to each of the input statements, comprising the steps of:

reading the program statements corresponding to a candidate code block from the program database;

representing each of the input variables for each input statement and each of the program variables in symbolic form as a symbolic memory value and transforming each program statement dependent on such an input variable into a symbolic expression;

creating a trial set of inputs for each of the input statements by finding a solution to the symbolic expression comprising actual input values corresponding to each symbolic memory value using dynamic symbolic exeuction;

performing an execution run of the computer program using the trial set of inputs and analyzing results obtained from the execution run for coverage of the candidate code block; and storing the trial set of inputs into the test suite if coverage of the candidate code block was obtained.

2. A method according to claim 1, further comprising the steps of:

creating a trial set of inputs for each of the input variables for each input statement using a pseudo random number generator.

3. A method according to claim 1, further comprising the step of:

building a parse tree for hierarchically representing a syntactical structuring of the program statements by associating one or more nodes in the parse tree with each such program statement and each such program variable.

4. A method according to claim 3, the step of transforming further comprising the steps of:

sequentially selecting the nodes in the parse tree representing one of the program statements;

symbolically executing the program statement corresponding to the selected nodes using the symbolic memory values for each of the input variables and the program variables contained in the program statement; and creating a symbolic expression based on results obtained from the symbolic execution.

5. A method according to claim 4, further comprising the steps of:

building a symbolic memory for hierarchically representing each of the symbolic memory values by associating one or more nodes in the symbolic memory with each such symbolic memory value;

determining whether the program statement modifies a memory location in a memory used by the computer program to store and retrieve data values; and writing such memory location modifications into the symbolic memory in symbolic form.

6. A method according to claim 5, further comprising the steps of:

determining whether the program statement is an external procedure call whose program statements are unknown; and resolving the external procedure call by at least one of the steps of:

referencing a symbolic run-time library for storing external procedures and executing such a stored external procedure corresponding to the external procedure call using the symbolic memory values for each of the input variables and the program variables contained in the external procedure call; or mapping each of the symbolic memory values for each of the input variables and the program variables contained in the external procedure call to a non-symbolic value and executing the external procedure call using such non-symbolic values.

7. A method according to claim 6, further comprising the steps of:

determining whether the selected program statement contains a branch condition;

converting each branch condition into a symbolic expression by replacing each of the input variables and the program variables contained in the branch condition with a symbolic memory value; and finding such a trial set of inputs for resolving the branch condition to take such actual input values that will force execution of the candidate code block.

8. A method according to claim 1, further comprising the step of:

instrumenting the computer program with instrumentation function calls comprising at least one of an instrumentation function call for coverage analysis, an instrumentation function call for block flow analysis or an instrumentation function call for branch condition analysis.

9. A method according to claim 1, further comprising the step of:

maintaining a program database for flow information as to paths of execution occurring in the computer program by breaking down the program statements into the code blocks and storing the code blocks in the program database.

10. A system for generating a test suite for a computer program, the computer program comprising program statements and program variables, including at least one input statement having one or more input variables, grouped into code blocks and stored in a program database, the test suite comprising sets of inputs, each of the sets of inputs corresponding to each of the input statements, comprising:

means for reading the program statements corresponding to a candidate code block from the program database;

means for representing each of the input variables for each input statement and each of the program variables in symbolic form as a symbolic memory value and means for transforming each program statement dependent on such an input variable into a symbolic expression;

means for creating a trial set of inputs for each of the input statements by finding a solution to the symbolic expression comprising actual input values corresponding to each symbolic memory value using dynamic symbolic execution;

means for performing an execution run of the computer program using the trial set of inputs and means for analyzing results obtained from the execution run for coverage of the candidate code block; and means for storing the trial set of inputs into the test suite if coverage of the candidate code block was obtained.

11. A method using a computer for creating a symbolic expression using dynamic symbolic execution for use in generating a test suite for a computer program, the computer program comprising program instructions and program variables, including input variables, the program instructions represented as nodes organized into a hierarchical parse tree, the program variables and input variables represented in symbolic form as symbolic memory values in nodes organized into a symbolic memory, comprising the steps of:

reading a node for representing a program instruction from the parse tree;

obtaining symbolic memory values for each such program variable and each such input variable used by the program instruction from the symbolic memory; and symbolically interpreting the program instruction using the symbolic memory values instead of actual values for each such program variable and each such input variable used by the program instruction to create the symbolic expression.

12. A method according to claim 11, further comprising the steps of:

determining whether the program instruction influences a branch condition occurring in one of the program instructions; and skipping the step of symbolically interpreting such a program instruction.

13. A method according to claim 11, wherein the computer program uses a memory having a plurality of locations to store and retrieve data values, further comprising the steps of:

determining whether the program instruction modifies one of the locations in the memory; and modifying the symbolic memory by writing a modification in symbolic form using the symbolic memory values for each such program variable and each such input variable used by the program instruction.

14. A method according to claim 11, further comprising the steps of:

determining whether the program instruction corresponds to an external procedure call whose program instructions are unknown; and resolving the external procedure call.

15. A method according to claim 14, the step of resolving further comprising the steps of:

maintaining a symbolic run-time library for storing commonly used external functions;

replacing each such program variable and each such input variable used by the external procedure call with its corresponding symbolic memory value;

replacing the external procedure call with its matching commonly used function from the internal symbolic run-time library; and producing such a symbolic expression using the corresponding memory values and the matched commonly used external function.

16. A method according to claim 14, the step of resolving further comprising the steps of:

mapping each such symbolic memory value used by the external procedure call to a non-symbolic value; and executing an object code function corresponding to the external procedure call using each such mapped non-symbolic value.

17. A method according to claim 11, further comprising the steps of:

determining whether a next program instruction is unknown; and resolving the next program instruction when the next instruction is unknown due to a branch condition.

18. A method according to claim 17, the step of resolving further comprising the steps of:

identifying the branch condition causing the next program instruction to be unknown;

transforming the branch condition into a real valued function that can be evaluated to a value that is less than or substantially equal to 0; and determining a path condition associated with the branch condition.

19. A method according to claim 18, further comprising the step of:

replacing each such program variable and each such input variable used by the branch condition with its corresponding symbolic memory value.

* * * * *